United States Patent Office 3,435,920
Patented Apr. 1, 1969

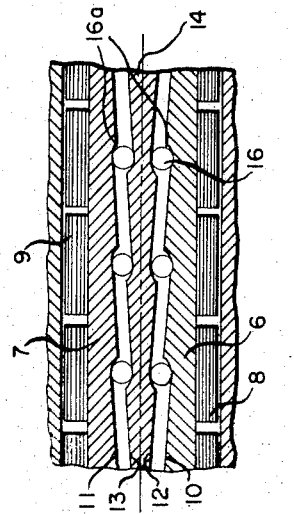
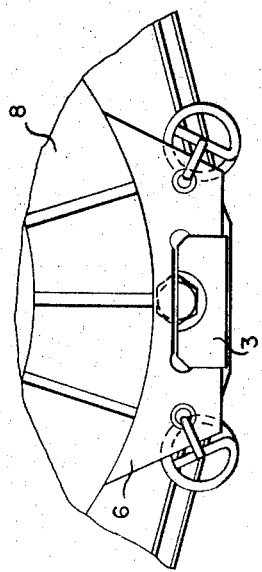
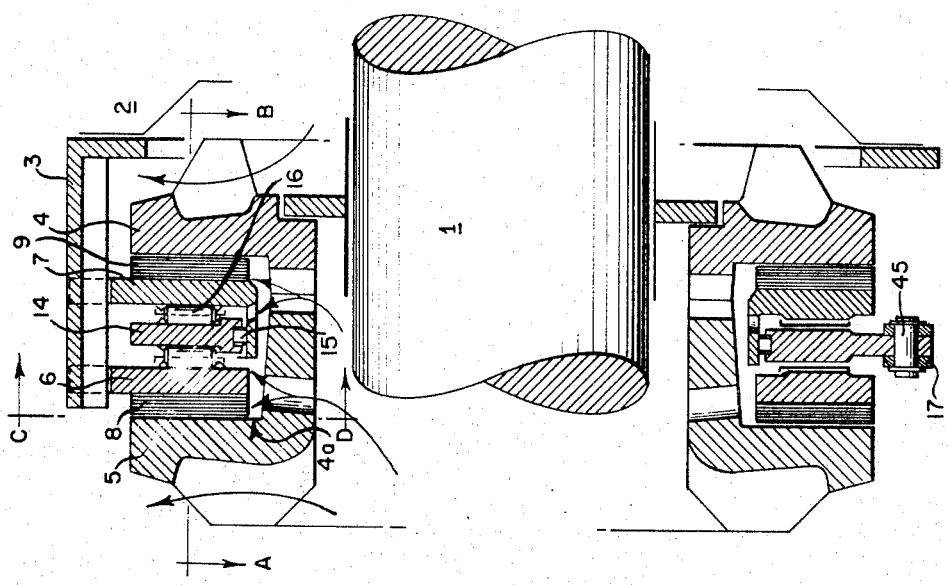

3,435,920
SPREADING-TYPE DISC BRAKE INCLUDING ADJUSTOR AND ACTUATOR THEREFOR
Hermann Klaue, Ave. des Planches 3, Montreux, Switzerland
Continuation of application Ser. No. 559,441, June 22, 1966. This application Feb. 1, 1968, Ser. No. 702,484
Int. Cl. F16d 55/00, 65/38, 11/06
U.S. Cl. 188—72                                12 Claims

ABSTRACT OF THE DISCLOSURE

A disc brake having a rotatable drum of generally U-shaped and outwardly opening cross-section and including disc members between the legs of the U and operable to cause brake engagement by limited rotational movement of a drive band also located in the opening between the legs of the U. The drive band is actuated by a link connected directly thereto and movable in a plane perpendicular to the axis of the brake. The link may be operated by either a hydraulic cylinder or a direct mechanical connection. A wear takeup device may be located in the hydraulic cylinder to adjust piston travel to make up for wear at the frictional brake surfaces.

---

This application is a continuation of my copending application Ser. No. 559,441, filed June 22, 1966, now abandoned.

This invention relates to disc brakes. In particular this invention relates to an improved disc brakes for limiting the rotational movement of a first member with respect to a second member which surrounds the first member by exerting a mechanical and/or hydraulic force upon the disc brake assembly in a direction tangential to the periphery of the disc brake assembly.

Heretofore disc brakes have been known which have employed two circular disc elements arranged within a rotating drum in such a manner as to be freely displaceable in the axial directon but fixed against rotation. Disc brake assemblies generally have at least two circular members, the first of which is rotated by an actuating means, and the second of which includes a frictional surface for engaging the rotating member to be braked. The opposing surfaces of these two circular members comprise opposing radially extending grooves with rolling members located in the grooves and extending from the bottom of a groove in one of the circular members to the bottom of the opposing groove in the other circular member. As the first circular member is rotated relative to the second, the rolling members rise out of the grooves to the raised portion of the opposed faces of the circular members thereby urging the second circular member against the rotating member to limit the rotational movement of the latter.

However, the known disc brakes of this general type have suffered from certain disadvantages. Since the disc brake elements have been located within the rotating drum, the arrangements for actuating the elements have taken up a large space and have not been as efficient as desired. Moreover, the previously known disc brake structures have not allowed maximization of cooling effects.

The purpose of the present invention is to provide a disc brake which is substantially improved in comparison with known disc brakes.

According to the present invention there is provided a disc brake assembly wherein the discs are located in an annular recess of U-shaped cross-section in a rotating drum which surrounds and is non-rotatably connected to a shaft which rotates about an axis. The disc elements are axially slidable but are non-rotationally mounted to the housing which surrounds the rotating drum member. A circular band member is located in the annular U-shaped recess and is adapted, upon limited rotational movement thereof, to urge the disc elements axially against the sides of the annular recess (the legs of the U) to limit the rotational movement of the rotating drum. Of course heat absorbing frictional members such as ceramic brake shoes, are mounted on the surface of the disc adjacent the sides of the annular recess. The conversion of the rotational movement of the circular band member to axial movement of the disc elements is provided in a known manner by employing grooves in the opposing faces of the circular band member and the adjacent disc element, and employing rolling members in the grooves.

According to a feature of the present invention the circular band member is rotated by applying a force in a direction tangential to the periphery of the circular band member to rotate the same. According to the present invention it is possible to employ either one or both of a mehanical actuating means or a hydraulic actuating means for turning the circular band member.

The hydraulic force is provided by a hydraulic cylinder and a piston member within the cylinder, the piston acting through a link which is connected directly to the circular drive band. In addition, mechanical movement of the brake may be provided by a mechanical lever which turns a pinion which is in turn meshed with gear teeth located on the outer periphery of the circular band member.

Another feature of the present invention is that the arrangement allows maximum utilization of cooling procedures. Radial fins or ribs may be provided on the outer periphery of the rotating drum. In addition, holes may be provided in the radially innermost side of the rotating drum to allow cooling fluid to flow from the axis of the brake outwardly through the U-shaped recess and through the disc elements of the brake structure.

With the arrangement of the disc brake according to the present invention it is possible to produce a disc brake in which a greatly increased braking power may be transmitted in a restricted space. Also, it is possible to employ both hydraulic and mechanical actuating means, both within a very limited space, and both with maximum efficiency.

Thus, it is an object of this invention to provide an improved disc brake in which many disadvantages of previously known disc brakes are eliminated.

It is another object of this invention to provide a disc brake structure wherein the disc elements are located within an outwardly extending annular U-shaped recess in a rotating drum, and nonrotatably mounted on the outer housing.

It is another object of this invention to provide a disc brake structure mounted on the exterior of a rotating member and actuated by a force acting tangentially to the periphery of the disc brake assembly, in a plane substantially perpendicular to the axis of the rotating member. It is still another object of this invention to provide improved hydraulic and mechanical disc brake actuating means for acting upon the outer periphery of the disc brake assembly with maximum efficiency and in a minimum space.

Other objects and the attendant advantages of the present invention will become apparent from the detailed description to follow together with the accompanying drawings in which:

FIG. 1 is a longitudinal cross-section of the brake according to the present invention.

FIG. 2 is a partial cross-section taken along line A–B of FIG. 1.

FIG. 3 is a partial cross-section taken along line C–D of FIG. 1.

Figure 4:
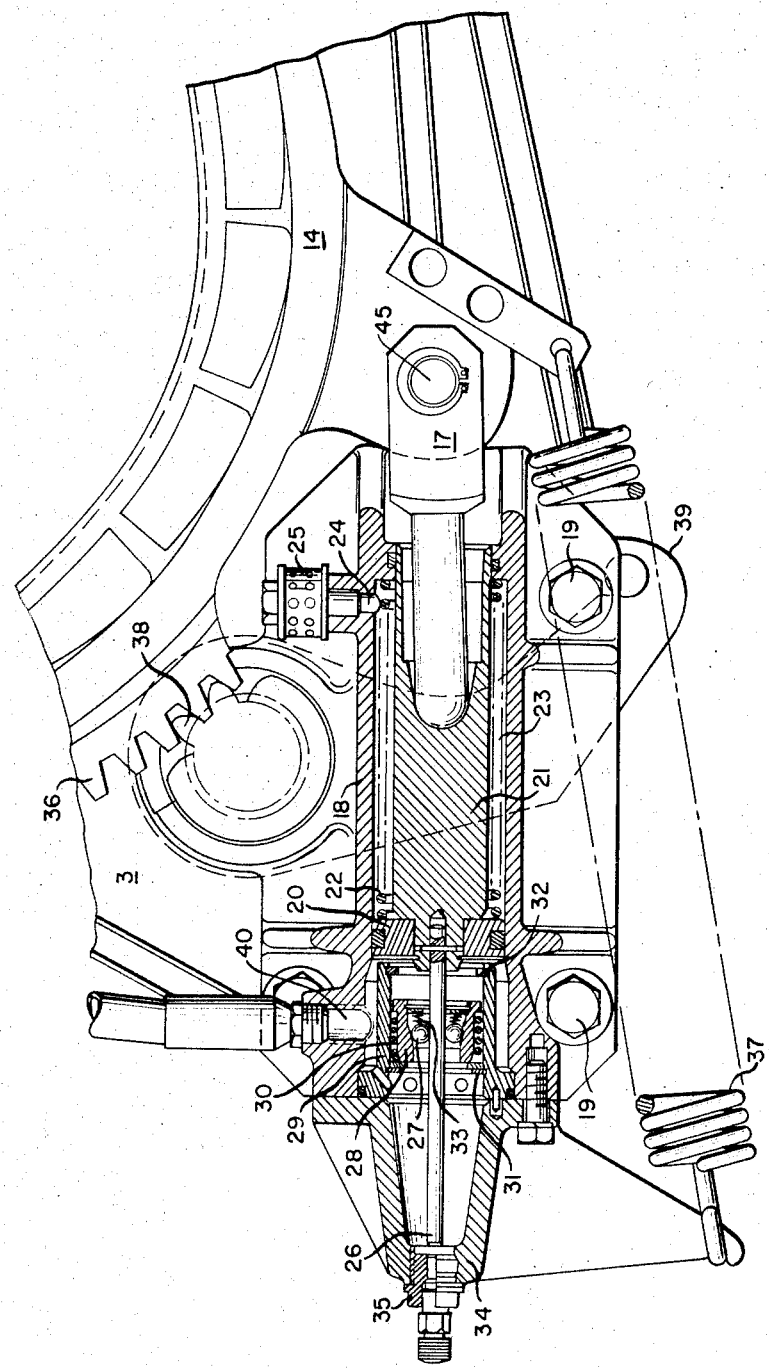
FIG. 4 is a partial elevation on a larger scale showing the means for actuating the brake, including the hydraulic cylinder which is represented in longitudinal cross-section.

Referring now to the drawings, there is shown a central rotating shaft 1 to which are connected the rotating drum 4 and the rotating housing member 5. Thus, elements 1, 4 and 5 are non-rotatably connected together to form the rotating portion of the disc brake assembly. The drum 4 and housing 5 are provided with radial ribs to facilitate the evacuation of heat generated by the friction of the braking action. An outer support member 3 is connected to a transmission drum, indicated by the numeral 2. In order to further facilitate evacuation of heat, openings are provided in the inner portion of the rotating drum 4 and in the outer support housing 3.

The rotating drum 4 and rotating housing 5 form an annular recess extending outwardly of a generally U-shaped cross section.

Annular disc elements 6 and 7 are mounted in the U-shaped recess in such a manner as to be axially slidable but fixed against rotation by engagement with the support member 3. Ceramic fittings 8 and 9 are provided between the disc elements 6 and 7 and the respective adjacent sides of the U-shaped recess. The connection between the discs and the support member 3 are provided by axially extending projections on the support member 3 which extend into axially extending grooves on the outer periphery of the discs 6 and 7.

Located between the disc elements 6 and 7 is a circular drive band 14. This band is mounted on the disc member 7 by means of radial roller bearings 15.

Referring to FIGURE 2, it can be seen that the opposing faces of the disc elements and the circular drive band include opposing grooves 16a in which are mounted radially extending rolling elements 16. This type of coupling means is well known per se. In the position shown in FIGURE 2 the disc elements 6 and 7 are in the position away from the adjacent faces of the U-shaped recess in the position closest to rotating circular drive band 14. However, as the drive band 14 is rotated relative to the discs 6 and 7, the rolling element 16 will rest against the raised portions of the opposing faces of elements 6 and 14 and 7. In this manner, the two disc elements 6 and 7 will be urged axially away from the member 14 towards the adjacent sides of the U-shaped recess. The fittings 8 and 9 will then come into contact with the sides of the U-shaped recess of elements 4 and 5 thereby braking the rotational movement of the rotating drum 4 and rotating housing 5.

The braking action is accomplished by turning the circular drive band 14. Either hydraulic or mechanical means may be used. But it is contemplated that the hydraulic means will be employed under normal circumstances, and that the mechanical actuating means will be an auxiliary braking mechanism.

Referring to FIGURE 4, the hydraulic means comprises a piston 20 and 21 mounted in a working cylinder 18, which piston moves the circular band 14 counterclockwise (as viewed in FIGURE 4) through the intermediary of a link 17 which is connected to the band by pin means 45. The piston 20 and 21, which is displaceable to the right, FIGURE 4, is countered by the force of a spring 22 in the cylinder 18. The cylinder 18 is fixed to the support member 3 by means of screws 19.

The chamber 23 in which the spring 22 is located is connected to the outer atmosphere through passage 24 which is closed by a dust filter 25. The portion of the piston indicated as 21 is connected to a rod 26 which in turn is acted upon by a wear takeup device which automatically adjusts the position of rod 26 (and thus piston 21) to adjust for wear at the brake shoes. This wear takeup device comprises an inner casing 28 having an interior conical surface which cooperates with a clamping device such as clamping balls 27. The inner casing 28 is movable axially within tubular member 29 between retaining rings 31 and 32 which are fixed in grooves formed in the interior surface of member 29. A spring 30 urges the casing 28 toward retaining ring 32. The clamping balls 27 are urged against the smaller portion of the conical interior surface of the casing 28 by spring member 33 to lock the rod 26 to the inner casing 28.

In the rest position casing 28 is normally against ring 31, the force of spring 30 being offset by the frictional engagement between elements 26, 27 and 28. To provide movement of the piston 21 and 22 to the right to rotate the drive band 14, fluid under pressure, introduced at inlet 40, acts directly upon the left end of elements 21 and 22. As these elements 21 and 22 move to the right they carry with them the rod 26. The rod 26 in turn carries with it the elements 27, 28, 30 and 33 of the wear takeup device. Normally element 28 will engage ring 32 just as the rod 26 has moved to the point at which the brakes engage. However, if wear has increased the distance which the piston must travel to the point of brake engagement, then the element 28 will engage ring 32 before the brake elements engage, after which the rod 26 will slip under the clamping balls 27, as clamping balls 27 move toward the larger end of the interior of casing 28 against the force of spring 33. This slipping movement will continue as long as rod 26 moves to the right which, of course, will continue until the new point of brake engagement is reached.

When the braking action is completed and pressure is removed from the left side of elements 21 and 22, the elements move to the left under the influence of springs 22 and 37. Clamping balls 27 immediately engage rod 26 under the force of spring 33 so that elements 27, 28, 30 and 33 now move to the left with rod 26 the same distance as those elements travelled on the movements towards brake engagement until casing 28 engages ring 31. However, since the rod 26 slipped under clamping balls 27 while moving towards brake engagement, the return travel of the braking elements will be less than the forward movement. This difference represents the wear takeup adjustment.

The hydraulic cylinder is closed by a housing 34 fixed in place by set screws. This housing is supplied with a set screw 35 through the opening of which a tube may be introduced in order to assure disengagement of the brakes by removing the force of the wear takeup device when it is desired to repair the disc brake in any manner, such as replacing the fittings 8 and 9.

The present invention also includes a mechanical means for rotating the circular band 14 to actuate the disc brake. A portion of the exterior periphery of the circular band includes gear teeth 36 which mesh with teeth on a pinion member 38. The pinion is fixed to a lever 39 by means of a connecting shaft. Thus, by moving the lever the operator rotates the pinion 38 thereby causing rotation of the circular band member 14 to actuate the brake. Return of the mechanical actuating means to the normal position is provided the spring 37.

The invention has been described in considerable detail with particular reference to a preferred embodiment thereof. However, it should be apparent that variations and modifications can be effected within the spirit and scope of the invention as described hereinabove.

I claim:

1. A disc brake for limiting the rotational movement of a first member which is rotatable about an axis, with respect to a second member which surrounds a portion of the first member comprising; a drum surrounding and nonrotatably connected to the first member and positioned between the first and second members, said drum having a generally U-shaped cross-section taken in a plane including the said axis, the legs of the U extending from a base outwardly away from the said first member, at least one disc element mounted in the opening of the U, support members connected to said second member and extending across the opening of the U and slidably engaging the disc member to permit axial movement of the disc but prevent rotation of the disc relative to the second member, a circular band means located in the opening of the U on the side of the disc element away from one leg of the U and mounted for limited rotational movement about the said axis for urging the disc element towards the said leg of the U, thereby employing friction between the disc element and the leg of the U to limit relative rotational movement between the said first and second members, a link having a first end and a second end, said first end connected positively and directly by pin means to the said circular band means and movable therewith in a plane substantially perpendicular to said axis, and an actuating means connected to the second end of said link to move the link in said plane to cause the band to urge the disc elements towards the leg of the U, and the opening formed by the outer periphery of the U-shaped drum being substantially completely uncovered except for the said support members.

2. A disc brake as claimed in claim 1 wherein the said band member is disc shaped, and the opposing faces of the disc element and the band include opposed radially extending grooves, and rolling means positioned in the grooves to extend from the bottom of a groove in the disc element to the bottom of the opposing groove in the band, wherein when the band rotates a limited amount relative to the disc element the rolling means is carried to the raised portion adjacent the grooves thereby causing the disc element to move outwardly away from the band towards the said leg of the U.

3. A disc brake as claimed in claim 1 including heat dissipation means comprising: radial fins on the drum extending away from the said axis, and radial openings in the said drum between the said axis and the opening of the U to allow cooling fluid to flow through the said opening of the U.

4. A disc brake as claimed in claim 1 wherein said actuating means includes a hydraulic cylinder, a piston slidably mounted in the cylinder and connected to the outer periphery of the band means, said piston being actuatable to direct a force to the band means in a plane substantially perpendicular to the said axis and in a direction tangential to the outer periphery of the band means.

5. A disc brake as claimed in claim 4 wherein said actuating means further includes a mechanical actuating means comprising a lever, a geared pinion rotatable by said lever, and a plurality of gear teeth on the outer periphery of the said band means, wherein the pinion meshes with the teeth on the band to rotate the band about the said axis upon movement of the said lever.

6. A disc brake as claimed in claim 4 wherein said piston is pressure actuated to move the band to the position whereat the disc element frictionally engages the leg of the U, and including a spring means for returning the piston to the position whereat the disc element is out of frictional engagement with the leg of the U.

7. A disc brake as claimed in claim 6 wherein said hydraulic cylnder further includes a rod connected to the piston, an inner casing surrounding the rod and having a conical inner surface, circular clamping means between the rod and the concial surface and resilient means for urging the clamping means toward the smaller portion of the cone to close the space between the inner casing and the rod.

8. A disc brake as claimed in claim 1 including a second disc element mounted in the opening of the U between the circular band means and the leg of the U opposite from that leg against which the first mentioned disc element is urged, and said second disc element also being connected to the second member by said support members for axial but not rotational movement relative to the first member, wherein the said band means is operable to urge both disc elements towards their respective legs of the U-shaped drum when the said band means is rotated, thereby employing friction between each disc element and the corresponding leg of the U to limit relative rotational movement between the said first and second members.

9. A disc brake as claimed in claim 8 wherein said actuating means includes a hydraulic cylinder, a piston slidably mounted in the cylinder and connected to the outer periphery of the band means, said piston being actuable to direct a force to the band means in a plane substantially perpendicular to the said axis and in a direction tangential to the outer periphery of the band means.

10. A disc brake as claimed in claim 9 wherein said piston is pressure actuated to move the band to the position whereat the disc element frictionally engage the legs of the U, and including a spring means for returning the piston to the position whereat the disc element are out of fritional engagement with the legs of the U.

11. A disc brake as claimed in claim 9 wherein said actuating means further includes a mechanical actuating means comprising a lever, a geared pinion rotatable by said lever, and a plurality of gear teeth on the outer periphery of the said band means, wherein the pinion meshes with the teeth on the band to rotate the band about the said axis upon movement of the said lever.

12. A disc brake for limiting the rotational movement of a first member which is rotatable about an axis, with respect to a second member which surrounds a portion of the first member comprising: a drum surrounding and nonrotatably connected to the first member and positioned between the first and second member, and drum having a generally U-shaped cross-section taken in a plane including said axis, the legs of the U extending from a base outwardly away from the said first member at least one disc element mounted in the opening of the U and nonrotatably connected to the second member, a circular band means located in the opening of the U on the side of the disc element away from one leg of the U and mounted for limited rotational movement about the said axis for urging the disc element towards the said leg of the U, thereby employing friction between the disc element and the legs of the U to limit relative rotational movement between the said first and second members, and an actuating means for rotating the band means about the said axis to cause the said band means to urge the disc element toward the said leg of the U, said actuating means including a hydraulic cylinder, a piston slidably mounted in the cylinder and connected to the outer periphery of the band means, said piston being actuable to direct a force to the band means to cause said limited rotational movement thereof, and a rod completely enclosed within the hydraulic cylinder and having one of its end connected to the piston and having its other end free for limited movement transverse to the axis of the rod, an inner casing surrounding the rod and having a conical inner surface, a circular clamping means between the rod and the conical surface and resilient means for urging the clamping means towards the smaller portion of the cone to close the space between the inner casing and the rod, means in the hydraulic cylinder for limiting the movement of the inner casing between a first position corresponding to the normal disengaged position of the piston and a second position corresponding to the position of the piston whereat the brake engages and wherein further movement of the piston beyond the second position causes the clamping means to move to the larger end of the cone to permit the said rod to move relative to the said inner casing.

References Cited

UNITED STATES PATENTS 2,831,552 4/1958 Kershner.

FOREIGN PATENTS 1,126,750 3/1962 Germany.
1,161,770 1/1964 Germany.
861,828 3/1961 Great Britain.
366,759 2/1963 Switzerland.

GEORGE E. A. HALVOSA, *Primary Examiner.*

U.S. Cl. X.R.

188—196; 192—70